United States Patent [19]

Gensike et al.

[11] 4,056,321
[45] Nov. 1, 1977

[54] MICROFICHE DUPLICATING APPARATUS

[75] Inventors: Karl H. Gensike, Northridge; Robert C. Marsh, El Monte; John D. Reinhard, Los Angeles, all of Calif.

[73] Assignee: Dymat Photomatrix Corporation, Santa Monica, Calif.

[21] Appl. No.: 700,046

[22] Filed: June 25, 1976

[51] Int. Cl.² .................. G03B 29/00; G03B 27/04
[52] U.S. Cl. ..................................... 355/99; 355/29
[58] Field of Search ................... 355/11, 77, 27–29, 355/64, 78, 79, 89, 97, 99, 100, 114, 132, 39

[56] References Cited

U.S. PATENT DOCUMENTS

| 1,481,472 | 1/1924 | Lamphier | 355/114 |
|---|---|---|---|
| 2,607,264 | 8/1952 | Gazza | 355/29 |
| 2,933,030 | 4/1960 | Bornemann | 355/99 |
| 3,252,370 | 5/1966 | Luther | 355/64 X |
| 3,535,039 | 10/1970 | Lakin et al. | 355/100 |
| 3,600,089 | 8/1971 | Walter | 355/99 |
| 3,836,252 | 9/1974 | Touchette et al. | 355/99 X |

FOREIGN PATENT DOCUMENTS 88,539   5/1922   Austria ................ 355/39

Primary Examiner—Donald A. Griffin
Attorney, Agent, or Firm—Ralph B. Pastoriza

[57] ABSTRACT

The duplicator comprises a housing with a carrier supporting first and second spaced platens alternately movable by the carrier to a light exposure station in the housing. Master microfiches to be duplicated are manually positioned on the platens such that when a master microfiche on the first platen is in the housing being exposed, a second master microfiche may be loaded on the second platen, preparatory to having a duplicate made. A foot pedal is provided to actuate movement of the platen carrier and also control a vacuum hold down system for the master microfiches positioned on the platens. A capstan driven by a geneva movement in the housing positions successive lengths of film from a film reel in the housing at the light exposure station for contact printing with the master microfiche on the platen positioned at the light exposure station. A pivoted pair of rollers exert a tension bias on film from the reel to the capstan to maintain it taut and also provide an arrangement whereby the resistance to pulling movement of the successive lengths of film by the capstan is always the same for each successive length independently of the amount of film on the supply reel in the housing.

5 Claims, 10 Drawing Figures

MICROFICHE DUPLICATING APPARATUS

This invention relates generally to microfiche systems and more particularly to an improved apparatus for duplicating microfiche masters on microfiche film.

BACKGROUND OF THE INVENTION

A microfiche, as the term is used in the art, constitutes an exposed film approximately the size of a conventional indexing card containing rows and columns of separate frames or images. Each frame or image, for example, might represent the reduction of a printed page of material from a document and in the event that five rows and twelve columns are provided there can be recorded on a single microfiche sixty pages of such information. The purpose for microfiche is similar to that of microfilm. However, microfiche has one advantage over microfilm in that a selected portion of a recorded document can readily be searched and reviewed without having to reel through an entire continuous microfilm. Special viewers are provided for microfiche wherein the microfiche itself is inserted in the viewer and positioned along rectangular coordinates to cause the desired frame or image on the microfiche to be projected onto the viewer screen.

Normally, a master file of microfiche containing reduced data of an entire operation is maintained. If specific data is required from this file, the particular microfiche containing this data is pulled and may be read in a viewer as described above. On the other hand, personnel at physically spaced locations may wish to examine the records and towards this end it is common practice to simply make a duplicate of the master microfiche and send this on to those interested persons, the original master microfiche being restored in the master file. In fact, it is not uncommon practice to provide a large number of duplicates of a single microfiche in order that several different persons can review data at the same time.

In view of the foregoing, several different types of microfiche duplicators have been developed. These duplicators normally include a platen for receiving a master microfiche, a duplicate of which is to be made. The master microfiche is moved into a housing wherein it is positioned in contact with duplicate microfiche film and a contact print is made. In the more sophisticated versions, the contact print is then automatically developed by an appropriate development chamber within the housing of the apparatus and the duplicate copy can be retrieved from an appropriate tray or hopper.

While such duplicators as described above serve their function well, there is room for considerable improvement. The use of microfiche in the industry has proliferated to an enormous extent and literally thousands of copies of masters may be required in each of many commercial operations. The basic problem to be overcome is that of providing a microfiche duplicating apparatus which minimizes requirements on the operator in making duplicates to the end that greater speed can be achieved and yet assure that the duplicate microfiche are of acceptable quality.

To increase the speed of copy production, it has already been proposed to provide a double platen arrangement such that an operator can load one platen with a master microfiche and position the same within the apparatus housing for contact printing with duplicate film within the housing and while this process is being carried out, a second master microfiche can be loaded on the second platen. This second platen is then positioned in the housing and the master microfiche in the first platen removed and a third master placed therein.

Notwithstanding the provision of a double platen to increase the speed of reproduction, there are still severe demands on the operator. First, it is vital that the master microfiche be exactly positioned on the receiving platen and towards this end hold-down clips and the like have been provided but there is still a certain amount of time involved in the securing of the master microfiche on the platen. Secondly, where a reel of duplicate film is contained in the housing, it is necessary to assure that an exact length of microfiche film from this duplicate reel is properly positioned for registration with the master microfiche when the same is moved into the housing for the contact printing. As the reel of duplicate microfiche film in the housing becomes depleted, the pulling forces on the film wound on the reel vary and thus proper registration of the duplicate film with the master microfiche cannot always be assured. Thirdly, in order to provide intermittent movement of the duplicate reel of film in the housing, stepper motors have been used in an effort to assure that equal successive lengths of film will be properly positioned for contact printing with the master microfiche. However, stepper motors are not always accurate and if the motor is off by a single step, poor registration between the master microfiche and given length of duplicate film results. Thus, there can occur overlaps when making a number of successive copies. Fourthly, with present-day machines there is normally provided manually operable push-buttons or the like for actuating the apparatus in the making of each duplicate copy and as a result, an operator must use one hand to operate these controls leaving only one hand free for a part of the time at least necessary in positioning successive master microfiche on the platens.

BRIEF DESCRIPTION OF THE PRESENT INVENTION

With all of the foregoing considerations in mind, the present invention contemplates the provision of a vastly improved microfiche duplicating apparatus wherein the foregoing problems as well as additional problems associated with presently available equipment are overcome.

With respect to the foregoing, the apparatus of the present invention includes, in combination, a housing having a light exposure station, a carrier means including first and second platens for receiving master microfiches of which a duplicate is to be made, means for moving the carrier means to alternately position the platens at the light exposure station in the housing, and a reel of microfiche film contained in the housing. Film moving means receive the film from the reel and position successive given lengths of the film into contact printing position with a master microfiche at the light exposure station. A foot pedal means, in turn, is provided for actuating the carrier means, which is motorized, to position one of the platens with a master microfiche in the housing whereby both hands of the operator are free to load a master microfiche on the other of the platens during the time a contact print is being made of the master microfiche on the one of the platens.

In addition, in accord with the preferred embodiment of this invention, a movable roller means is provided between the film reel and the film moving means within the housing to provide the same resistance force to movement of successive lengths of the film by the film moving means independently of the amount of film on the reel so that consistent registration with a master microfiche is assured. Also, a vacuum hold down system operable by the foot pedal is provided to secure the master microfiche in proper position on a platen, thereby eliminating the need for clips and the like and also greatly reducing the time required of an operator in properly positioning a master microfiche.

Other features of this invention include an improved capstan type drive in combination with a one-way clutch and geneva movement for increasing the accuracy of film registration and eliminating the necessity of stepper type motors and the like.

BRIEF DESCRIPTION OF THE DRAWINGS

A better understanding of this invention as well as further features and advantages thereof will be had by now referring to the accompanying drawings in which.

DETAILED DESCRIPTION OF THE PREFERRED EMBODIMENT

Figure 1:
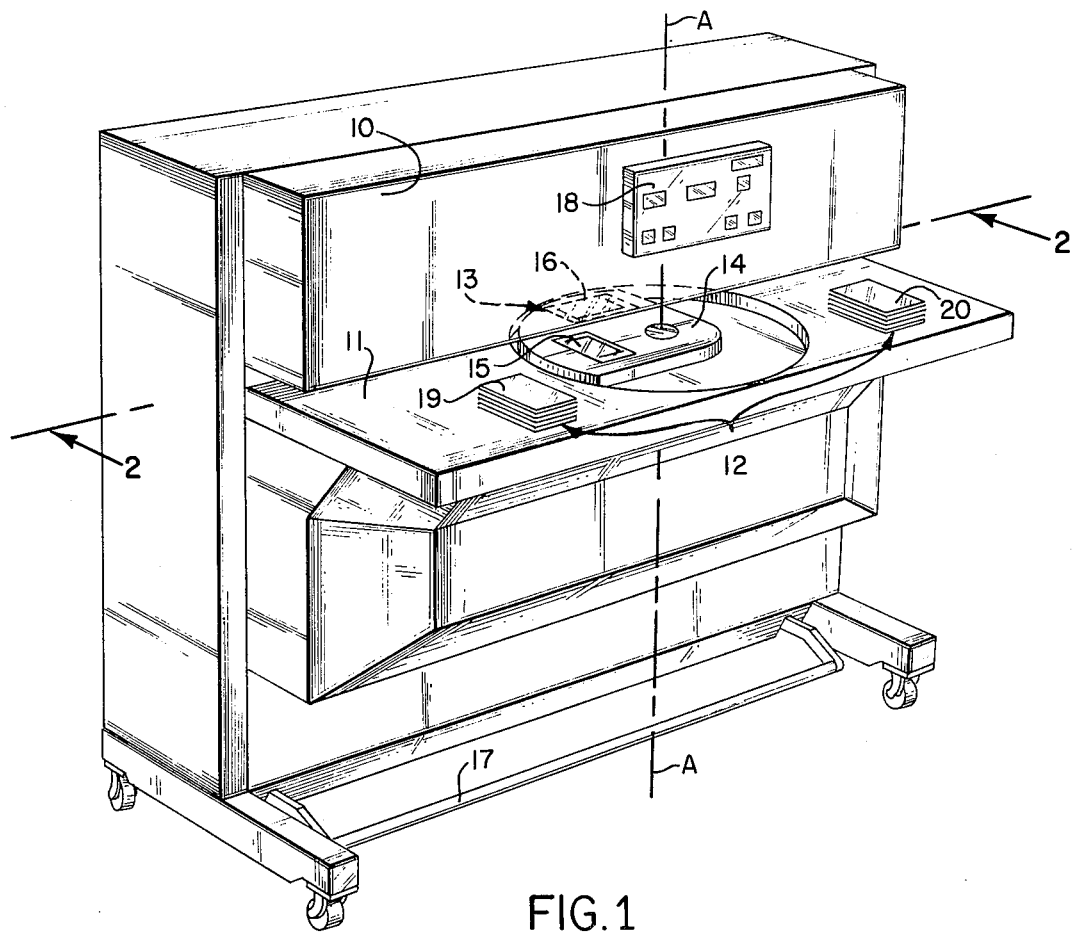
FIG. 1 is an overall perspective view of the microfiche duplicating apparatus of this invention.

Referring first to FIG. 1, the microfiche duplicating apparatus includes a housing 10 supporting a table 11 defining a work loading station exterior of the housing as indicated by the lead line 12 terminating in arrows and a light exposure station within the housing indicated by the dashed arrow 13. Set into the table 11 is a platen carrier 14 mounted for movement between first and second positions. In the embodiment illustrated, this movement constitutes a rotational movement about a vertical axis A—A.

As shown in FIG. 1, the platen carrier 14 includes first and second platens 15 and 16 in spaced relationship such that when the carrier is in a first position as illustrated in FIG. 1, the first platen 15 is exterior of the housing 10 adjacent to the work loading station 12 and the second platen 16 is positioned within the housing at the light exposure station 13. When the platen carrier 14 is rotated about the axis A—A 90° to its second position, the first platen 15 will be positioned within the housing 10 at the light exposure station 13 and the second platen 16 will be exterior of the housing adjacent to the work loading station 12.

A foot pedal means 17 is provided for actuating the platen carrier 14 as well as operating a vacuum hold down system which will become clearer as the description proceeds. A control panel 18 includes an appropriate start button to initiate operation of the apparatus, as well as various controls to set in the number of duplicate copies desired, stop the machine in case of an emergency and so forth. However, once the machine is started, the making of copies can be wholly controlled by the foot pedal 17 thereby leaving both hands of the operator free to load master fiche at the loading station 12 onto the platens 15 and 16. In this respect, there is illustrated in FIG. 1 stacks 19 and 20 of master fiche to be duplicated at the work loading station 12.

Figure 2:
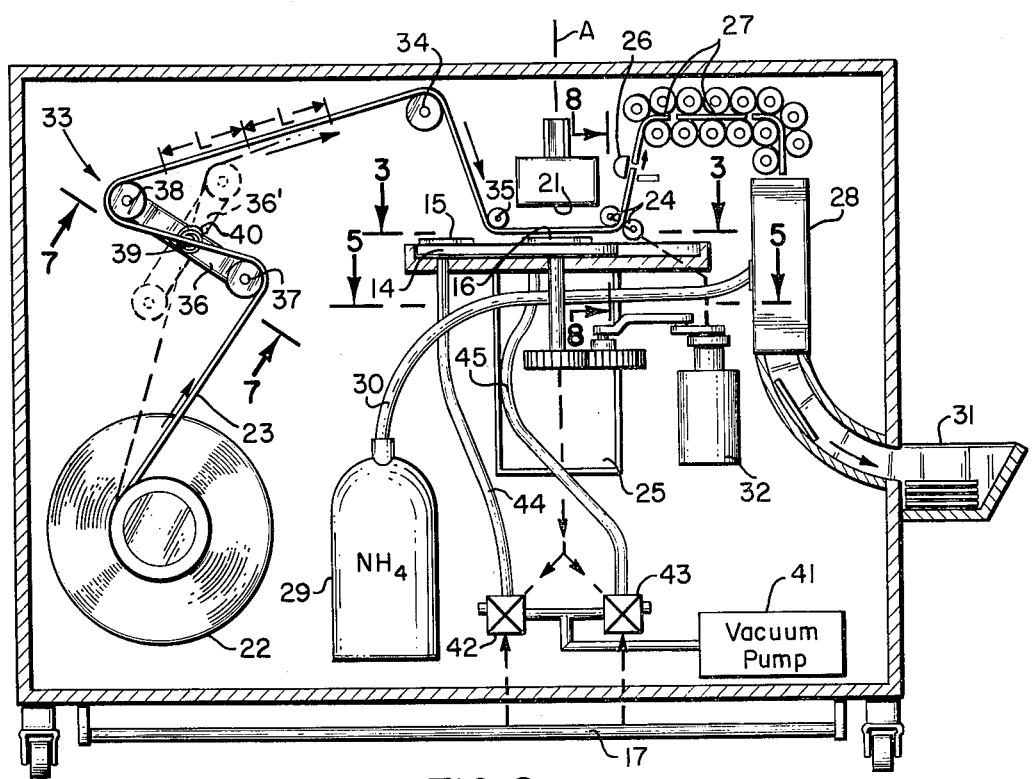
FIG. 2 is a cross section partly schematic in form looking in the direction of the arrows 2—2 of FIG. 1.

Referring now to the cross section of FIG. 2, which exposes the interior of the housing 10 looking from the front, there is shown at the upper central portion of the drawing a contacting platen 21 movable into opposed engaging relationship with that one of the first and second platens positioned at the light exposure station. In FIG. 2, the second platen 16 on the platen carrier 14 is shown in opposed relationship to the contacting platen 21.

Referring to the lower left portion of the drawing of FIG. 2, there is provided a reel 22 of microfiche film 23 mounted in the housing 10. It will be noted that the film 23 passes over appropriate roller means to a position between the platen 16 and contacting platen 21. Immediately to the right of these platens as shown in FIG. 2 is a driving capstan means 24 receiving the microfiche film and designed to move successive given lengths of the film to the light exposure station between the contacting platen and the second platen 16. Such successive lengths of film are illustrated in the upper left portion of the drawing by the letter L.

Each of the platens 15 and 16 comprise thick glass plates upon which the master microfiche is positioned. A light source indicated generally by the block 25 beneath the platen 16 serves to expose the raw microfiche film length 23 sandwiched between the platen 16 and the contacting platen 21 to effect the contact printing, this light source directing light up through the lower platen 16. The contacting platen 21 merely serves to hold firmly the given film length from the film 23 positioned at the light exposure station in proper contact with the master microfiche on the platen 16 and towards this end, the contacting platen 21 may be spring loaded at its four corners so that full engagement with a biasing pressure is assured. Any suitable vertical track means may be provided for enabling the contacting platen 21 to be raised and lowered as required.

Shown following the capstan drive means 24 is a cutting means 26 for cutting the referred to successive given lengths of the film after the same have been moved from the light exposure station to provide exposed microfiche. Each exposed microfiche in turn is transported by appropriate roller means 27 to a film developing chamber 28 which successively receives the cut lengths of microfiche and develops the same. Towards this end, there is provided within the housing 10 a supply of ammonia 29 and appropriate tubing 30 to the film developing chamber 28.

Developed microfiche are passed from the developing chamber 28 along a chute to an output hopper or tray 31.

Suitable motor means for moving the platen carrier 14 and driving the capstan means 24 is illustrated at the central right of the drawing of FIG. 2 at 32. The preferred form of driving the platen carrier 14 by the motor 32 will be subsequently described.

Referring to the upper left portion of the drawing of FIG. 2, there is indicated generally by the arrow 33 a roller means for guiding the film 23 from the reel 22 to the light exposure station, this roller means including an upper roller 34 and lower roller 35 adjacent to the light exposure station as shown.

In addition, the roller means 33 includes a lever 36 having a pair of rollers 37 and 38 mounted on its opposite ends, the lever being centrally pivoted as at 39 to the housing for swinging movement between a first position shown in solid lines and a second position shown in dotted lines at 36'. The microfiche film 23 from the reel 22 passes between the pair of rollers 37 and 38 as shown. A biasing means in the form of a coiled spring 40 at the pivot point 39 for the lever 36 biases the lever 36 to its first or solid line position illustrated in FIG. 2.

With the foregoing arrangement and the lever 36 positioned for movement between its first and second positions as described, a given length of microfiche film 23 corresponding to the given length L is drawn from the reel by the pair of rollers 37 and 38 when the lever 36 returns from its dotted line position 36' to its first solid line position 36. On the other hand, when the driving capstan means 24 is actuated to move the film 23 through the given length L the resistance to this movement is exerted by the coil spring 40 for the lever 36, the lever 36 moving from its solid line position to its dotted line position. Accordingly, successive lengths are always pulled against the same resistance forces exerted by the biasing means independently of the amount of film 23 on the reel 22.

Still referring to FIG. 2, there is shown in the lower right hand portion a vacuum source in the form of a vacuum pump 41 having associated valves 42 and 43 for communicating the vacuum from the pump 41 to the first and second platens 15 and 16 by way of vacuum lines 44 and 45. As indicated by the dot-dashed arrows extending from the foot pedal 17 to the first and second valves 42 and 43, the vacuum hold down system can be controlled by the foot pedal 17. In addition, automatic control of the valves 42 and 43 is effected by rotation of the platen carrier 14 as indicated by the dot-dashed arrows along the axis A—A.

Figure 3:
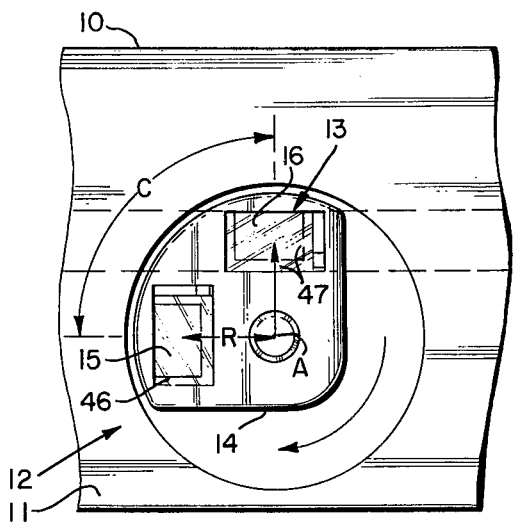
FIG. 3 is a fragmentary plan cross section taken in the direction of the arrows 3—3 of FIG. 2.
Figure 4:
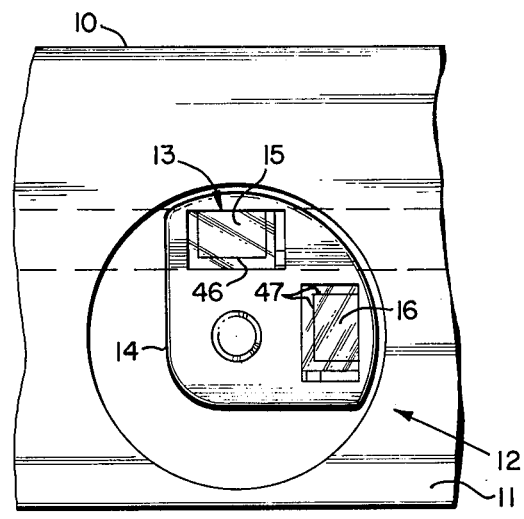
FIG. 4 is a view similar to FIG. 3 but illustrating a second position of certain component parts.

Referring now to FIGS. 3 and 4 looking downwardly on the platen carrier 14 in the table 11, the respective first and second positions of the platen carrier and first and second platens 15 and 16 are illustrated. It will be noted that each of the platens 15 and 16 includes channel means in the form of U shaped channels 46 and 47 respectively, these channels being formed in the glass plates and communicating with the vacuum control described in conjunction with FIG. 2.

When the platen carrier 14 is in the first position illustrated in FIG. 3, an operator can load a master microfiche onto the first platen 15, operation of the foot pedal placing the channel therein in communication with the vacuum source.

Upon rotation of the platen carrier 14 which can be accomplished by control of the foot pedal, the carrier is rotated to its second position illustrated in FIG. 4. In response to such rotation, the vacuum is maintained for the platen 15 overriding operation of the foot pedal for releasing the vacuum applied to the second platen 16 to enable easy removal of the master microfiche thereon. Similar appropriate operation of the valves 42 and 43 for the vacuum source described in FIG. 2 enables the alternate holding down of the master microfiche as the platen carrier moves between its first and second positions.

Figure 5:
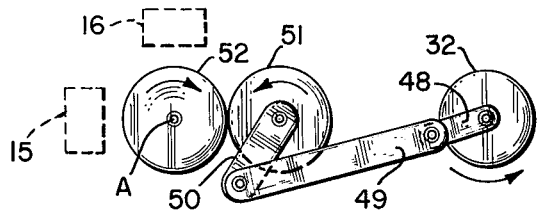
FIG. 5 is a schematic plan view looking in the direction of the arrows 5—5 of FIG. 2 of certain components in a first position.
Figure 6:
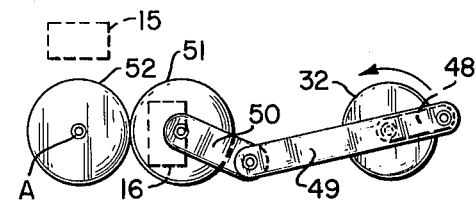
FIG. 6 is a view similar to FIG. 5 but illustrating the components in a second position.

Referring now to FIGS. 5 and 6, the actual rotation of the platen carrier 14 by the motor means 32 described briefly in conjunction with FIG. 2 will be explained in greater detail.

In FIG. 5, the position of the first and second platens 15 and 16 on the carrier 14 are depicted by the phantom lines and correspond to the referred to first position of the platen carrier. A link means is provided between the motor 32 and the platen carrier and includes a first link 48, intermediate link 49 and last link 50. The last link 50 connects to a gear 51 in meshing engagement with a gear 52 which in turn is physically connected to rotate the platen.

With the foregoing arrangement, and by proper dimensioning of the three links 48, 49 and 50, a unidirectional motor may be provided at 32. Thus, when the motor turns through a first half rotation in a first direction, the links are repositioned from that shown in FIG. 5 to that shown in FIG. 6 and it will be noted that this half rotation of the motor has caused the platen carrier and associated platens 15 and 16 to rotate through 90° thereby positioning the first platen 15 in the light exposure station and the second platen 16 adjacent to the loading station. For the next half rotation of the drive motor 32 in the same direction, the carrier is rotated back through the same circumferential distance to the position illustrated in FIG. 5. The link means thus enables a uni-directional motor to be utilized in effecting the desired oscillation of the platen carrier between its first and second positions.

With reference again to FIG. 3, it will be noted that the first and second platens 15 and 16 are spaced a radial distance R from the axis A of the platen carrier and also a given circumferential distance C from each other. While the circumferential distance C is 90° as illustrated, it could be some other circumferential distance. In any event, the linkage described in FIGS. 5 and 6 is such as to effect a rotation of the platen carrier between its first and second positions a distance corresponding to the circumferential distance C.

Figure 7:
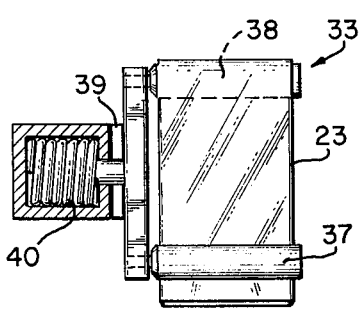
FIG. 7 is an elevational view partly in cross section of a component of the apparatus looking in the direction of the arrows 7—7 of FIG. 2.

FIG. 7 illustrates in greater detail the roller means in the form of the pair of rollers 37 and 38 centrally pivoted to the housing as at 39 and as described in FIG. 2. In FIG. 7, the coil spring 40 is shown in clearer detail. As mentioned, this spring exerts a biasing force so that the film 23 passing between the rollers can have successive lengths thereof pulled with a consistent pulling force for each successive length.

Figure 8:
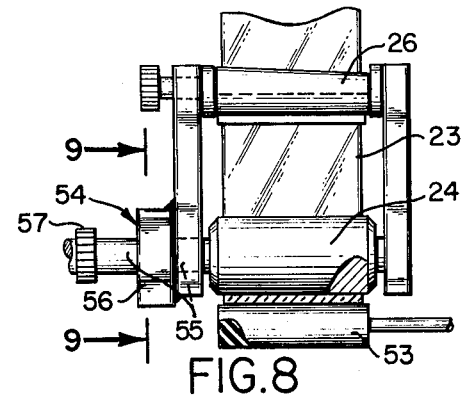
FIG. 8 is an elevational view of further components of the apparatus looking in the direction of the arrows 8—8 of FIG. 2.

Referring now to FIG. 8, there are shown further details of the driving capstan means described in conjunction with FIG. 2 for moving the film 23. As shown, the preferred structure includes a stainless steel capstan 24 cooperating with a pinch roller 53 which may constitute rubber. In FIG. 8, the cutter means 26 is shown mounted to the same structure as the capstan so that it will be assured that the proper given length of microfiche will be cut.

In order that successive lengths of microfiche film will be properly pulled into the light exposure station for contact printing with the master microfiche, the capstan 24 is arranged to rotate a precise amount each time it is actuated. For example, the diameter of the capstan 24 can be made such that its circumference is precisely equal to said given length. In this event, the capstan 24 is rotated exactly once for each given length of film to be positioned.

A one-way clutch 54 receives the capstan shaft 55 and includes a housing portion 56 secured to the frame. Shaft 55 passes through the housing and terminates in a gear 57.

Figure 9:
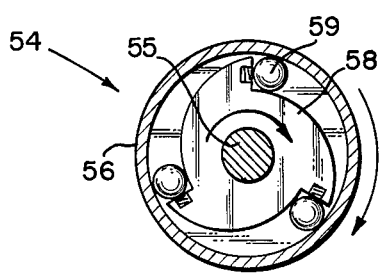
FIG. 9 is a cross section taken in the direction of the arrows 9—9 of FIG. 8; and, FIG. 10 illustrates a geneva drive utilized in the apparatus.

Referring to the cross section of FIG. 9, the one-way clutch 54 is shown in greater detail. In this FIGURE, the capstan shaft 55 is shown rigidly secured to an inner plate 58 arranged to rotate within the outer housing 56 which, as stated, is secured to the frame. Peripheral arcuate cut-outs are provided in the plate 58 as shown and three locking balls 59 are positioned between the floor of the cut-outs and the inside peripheral wall of the housing 56. These balls are dimensioned to permit forward rotation of the plate 58 and shaft 55; that is, in a clockwise direction, but are spring biased as shown to lock up between the arcuate cut-outs and inside peripheral wall of the housing if any attempt is made to rotate the plate 58 and shaft 55 in an opposite or counterclockwise direction as viewed in FIG. 9. Accordingly, the capstan 24 is locked against rotation in a direction opposite to the direction it moves to pull the film 23.

In view of the foregoing, it will now be appreciated that when the lever and pair of rollers described in FIG. 7 and in FIG. 2 is returned from its dotted line position 36' shown in FIG. 2 to the solid line position, the film 23 will be pulled from the reel 22 rather that back over the various rollers from the light exposure station. In other words, the capstan drive 24 securely holds the film against leftward movement as viewed in FIG. 2.

Figure 10:
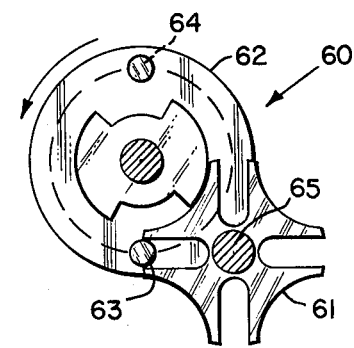

Referring to FIG. 10, there is schematically indicated a geneva gear arrangement designated generally by the arrow 60 for connecting an appropriate driving motor to the capstan 24 such that the capstan 24 will only be rotated in the desired given increments to pull the correct given length of film into the light exposure station. This geneva movement includes a star gear 61 and cooperating pin wheel 62 provided with a pair of diametrically opposite pins 63 and 64. As the wheel 62 rotates in a counter-clockwise direction as viewed in FIG. 10 and as indicated by the arrow, the pins 63 and 64 will successively be received in the slot or channel portions of the star gear 61 to effect an exact 90° rotation thereof. The shaft 65 for the star gear 61 may be coupled to the shaft 55 of the capstan 24 through an appropriate step-up gear ratio of 4 to 1 so that the capstan 24 will execute an exact one rotation for each 90° movement of the star gear 61.

The provision of a geneva movement as described above eliminates the necessity for stepper motors and extremely accurate registration of the film in the light exposure station is assured.

OPERATION

With the foregoing description of the basic components of the microfiche duplicating apparatus in mind, its entire operation will be evident.

Initially, an operator may sit or stand in front of the table 11 of the housing 10 of FIG. 1 and stack up appropriate master microfiches to be duplicated at the loading station 12. The operator then depresses the foot pedal to turn off the vacuum control.

A first master microfiche of which a duplicate is to be made, may then be positioned at the work loading station 12 on the first platen 15, the foot pedal 17 being released to vacuum hold the master microfiche on the platen in its precise set position. While not shown or described, there are provided suitable end and edge guides for positioning of the master microfiche on the platen, the end guides being spring retractable into the platen when the contacting platen is moved down on top of the master microfiche in making a contact print. It should also be appreciated that both hands of the operator are available to handle the master microfiche since operation of the apparatus after initial start up can be controlled wholly by the foot pedal 17.

With the first master microfiche positioned on the first platen, the same is caused to move into the housing by the start button on panel 18 which automatically starts the motor means to effect the desired rotation of the carrier 14. Rotation of the carrier 14 actuates the vacuum valve 42 described in FIG. 2 to override the control of this valve by the foot pedal and maintain the vacuum on the first platen during the time that the master microfiche is moving into the housing 10 and also during the time that a contact print is being made.

When the carrier 14 is in its second position such as illustrated in FIG. 4, this previous master microfiche may be removed by depressing the foot pedal to remove the vacuum thereunder and another master microfiche to be duplicated positioned on the second platen.

Release of the foot pedal will then cause the vacuum hold down for the second platen to secure the positioned master microfiche on this platen and automatically effect rotation of the platen carrier after completion of the first exposure in the reverse direction to return it to its first position illustrated in FIG. 3.

The various steps following the initial operation of the start button can be repeated, all such steps being wholly controlled by the foot pedal. Because the operator has both hands free to load one platen while a contact print is being made on the master microfiche on the other platen, the time involved in duplicating a large number of microfiche masters is reduced substantially as compared to the time required if only a single platen or even a double platen which required manual operation were used.

It will be understood, as described heretofore, that the control panel 18 includes means for setting in the number of desired copies if more than one copy of a single master microfiche is desired. A suitable power off switch is also included on the control panel 18 to shut down operation of the machine after a duplicating operation has been completed.

While the foot pedal is normally operated by a person's foot, any suitable actuating means operable by a person's knee or thigh or other portion of his body to leave his hands free may be used.

From all of the foregoing, it will thus be evident that the present invention has provided a greatly improved microfiche duplicating apparatus wherein problems of registration and speed and the like associated with prior art available machines have been either eliminated or substantially reduced.

What is claimed is:

1. A microfiche duplicating apparatus including, in combination:
    a. a housing supporting a table defining a work loading station exterior of the housing and a light exposure station within said housing;
    b. a platen carrier set in said table and mounted for movement between first and second positions, said carrier having first and second platens in spaced relationship such that when said carrier is in said first position, the first platen is exterior of said housing adjacent to said work loading station and the second platen is positioned within said housing at said light exposure station, and when said carrier is in said second position, said first platen is positioned within said housing at said light exposure station and said second platen is exterior of said housing adjacent to said work loading station;

c. a contacting platen positioned in said housing and movable into opposed engaging relationship with that one of the first and second platens positioned at said light exposure station;

d. a reel of microfiche film mounted in said housing;

e. a driving capstan means in said housing receiving the microfiche film from said reel for moving successive given lengths of said film to said light exposure station between said contacting platen and that one of said first and second platens positioned at said light exposure station;

f. roller means in said housing between said reel and driving capstan means for guiding movement of said microfiche film from said reel to said light exposure station, said roller means including a lever having a pair of rollers mounted on opposite ends and being centrally pivoted to said housing, said microfiche film from said reel passing between said pair of rollers; and biasing means biasing said lever to a first position such that pulling of the film over the pair of rollers by said driving capstan means swings said lever to a second position against the bias of said biasing means, said biasing means thereafter returning said lever to said first position, a given length of microfiche film corresponding to each of said given lengths being drawn from said reel by said pair of rollers upon return of the lever to its first position so that the driving capstan means in moving said microfiche film through said successive lengths always pulls against the same resistance forces exerted by said biasing means independently of the amount of film on said reel;

g. a light source in said housing for exposing the given length of said microfiche film positioned at said light exposure station;

h. cutting means in said housing for cutting said successive given lengths of said film after the same have been moved from said light exposure station to provide exposed microfiche;

i. film developing chamber means in said housing for successively receiving the cut lengths of microfiche and developing the same; and j. motor means for moving said platen carrier and driving said driving capstan means whereby a first master microfiche of which a duplicate is to be made may be positioned at said work loading station on said first platen and moved into said housing to effect a contact print with one of said given lengths of microfiche film at said light exposure station when said light source is energized, and whereby a second master microfiche may be positioned on said second platen during the time of exposure to said light source of said first master microfiche and moved into said housing for exposure with a next successive length of microfiche film during which time said first platen is available at said work loading station for removal of said first master microfiche and insertion of a third master microfiche, successive copies of successive master microfiches being made in a similar manner such that the time involved in duplicating a large number of microfiche masters is reduced as compared to the time required if only a single platen for receiving a microfiche master were available.

2. An apparatus according to claim 1, including a foot pedal for operating said motor means whereby both hands of an operator are free to load master microfiche onto that one of said first and second platens adjacent to said work loading station.

3. An apparatus according to claim 2, including a vacuum source in said housing, said first and second platens each incorporating channel means; and first and second valve means operable by said foot pedal for placing said channel means in communication with said vacuum source whereby a vacuum hold down system is provided to hold the master microfiche in position on its associated platen while said carrier is moving and while the platen is at said light exposure station.

4. An apparatus according to claim 1, in which said driving capstan means includes a stainless steel capstan and cooperating pinch rollers; a geneva gear means for driving said capstan; and a one way clutch connected to said capstan, said one way clutch locking said capstan against rotation in a direction opposite to that used in moving said film whereby when said lever moves from its second position back to its first position, the length of said film at said exposure station is held while a next given length of film is being pulled from said reel by return movement of said lever.

5. A microfiche duplicating apparatus including, in combination:

a. a housing supporting a table defining a work loading station exterior of the housing and a light exposure station within said housing;

b. a platen carrier set in said table and mounted for rotational movement between first and second positions, said carrier having first and second platens in radially spaced relationship from the axis of rotation of said carrier and circumferentially spaced from each other such that when said carrier is in said first position, the first platen is exterior of said housing adjacent to said work loading station and the second platen is positioned within said housing at said light exposure station, and when said carrier is rotated to its said second position, said first platen is positioned within said housing at said light exposure station and said second platen is exterior of said housing adjacent to said work loading station, the rotational movement of said carrier between its first and second positions corresponding to the circumferential spacing between said first and second platens;

c. motor means includes a uni-directional drive motor for said platen carrier; and link means coupling said drive motor to said carrier such that for a first half rotation of said drive motor, said carrier is rotated through said circumferential spacing in one direction and for the next half rotation of said drive motor in the same direction, said carrier is rotated back through said circumferential spacing in the opposite direction whereby back and forth motion of said carrier is effected by said uni-directional drive motor;

d. a contacting platen positioned in said housing and movable into opposing engaging relationship with that one of said first and second platens positioned at said light exposure station;

e. a reel of microfiche film mounted in said housing;

f. a driving capstan means in said housing receiving the microfiche film from said reel for moving successive given lengths of said film to said light exposure station between said contacting platen and that one of said first and second platens positioned at said light exposure station;

g. a light source in said housing for exposing the given length of said microfiche film positioned at said light exposure station;

h. cutting means in said housing for cutting said successive given lengths of said film after the same have been moved from said light exposure station to provide exposed microfiches; and i. film developing chamber means in said housing for successively receiving the cut lengths of microfiche and developing the same, said motor means for moving said platen carrier also driving said driving capstan means whereby a first master microfiche of which a duplicate is to be made may be positioned at said work loading station on said first platen and moved into said housing to effect a contact print with one of said given lengths of microfiche film at said light exposure station when said light source is energized, and whereby a second master microfiche may be positioned on said second platen during the time of exposure to said light source of said first master microfiche and moved into said housing for exposure with a next successive length of microfiche film during which time said first platen is available at said work loading station for removal of said first master microfiche and insertion of a third master microfiche, successive copies of successive master microfiches being made in a similar manner such that the time involved in duplicating a large number of microfiche masters is reduced as compared to the time required if only a single platen for receiving a microfiche master were available.

* * * * *